US007421520B2

(12) United States Patent
Wilkins et al.

(10) Patent No.: US 7,421,520 B2
(45) Date of Patent: Sep. 2, 2008

(54) HIGH-SPEED I/O CONTROLLER HAVING SEPARATE CONTROL AND DATA PATHS

(75) Inventors: Virgil V. Wilkins, Perris, CA (US); Robert L. Horn, Yorba Linda, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 708 days.

(21) Appl. No.: 10/927,479

(22) Filed: Aug. 27, 2004

(65) Prior Publication Data

US 2005/0060477 A1     Mar. 17, 2005

Related U.S. Application Data

(60) Provisional application No. 60/498,599, filed on Aug. 29, 2003.

(51) Int. Cl.
    *G06F 3/00* (2006.01)
    *G06F 5/00* (2006.01)
(52) U.S. Cl. .............................. 710/36; 710/22; 710/52; 710/107; 710/300; 710/305; 710/310; 710/316
(58) Field of Classification Search .................. 710/36, 710/52, 300, 107, 305, 316, 22, 310
    See application file for complete search history.

(56) References Cited

U.S. PATENT DOCUMENTS

| 5,241,630 A |   | 8/1993 | Lattin, Jr. et al. |
| 5,450,609 A | * | 9/1995 | Schultz et al. ............... 711/114 |
| 5,828,856 A |   | 10/1998 | Bowes et al. |
| 6,230,219 B1 |  | 5/2001 | Fields, Jr. et al. |
| 6,356,984 B1 |  | 3/2002 | Day et al. |
| 6,434,664 B1 |  | 8/2002 | Buch et al. |
| 6,539,439 B1 |  | 3/2003 | Nguyen et al. |

* cited by examiner

*Primary Examiner*—Tonia L. M. Dollinger
*Assistant Examiner*—Chun-Kuan Lee
(74) *Attorney, Agent, or Firm*—Dickstein Shapiro LLP

(57) ABSTRACT

An I/O controller having separate command and data paths, thereby eliminating the bandwidth used by the commands and thus increasing bandwidth available to the data buses. Additionally, the I/O controller uses multiple dedicated data paths, for example, dedicated distributed buses, and provides increased speed due to improved hardware integration. The I/O controller employs distributed processing methods that decouple the external microprocessor from much of the decision-making, thereby providing improved operating efficiency and thus more useable bandwidth at any given clock frequency. Accordingly, the I/O controller is capable of maximizing I/O operations (IOPS) on all I/O ports by functioning at the rate of I/O connections to hosts and storage elements without becoming a bottleneck.

7 Claims, 3 Drawing Sheets

HIGH-SPEED I/O CONTROLLER HAVING SEPARATE CONTROL AND DATA PATHS

This application claims the benefit of U.S. Provisional Application No. 60/498,599, filed Aug. 29, 2003.

FIELD OF INVENTION

The present invention relates to network input/output (I/O) controllers. More specifically, the present invention relates to an I/O controller with separate control and data paths for improved performance.

BACKGROUND OF THE INVENTION

With the accelerating growth of Internet and intranet communication, high-bandwidth applications (such as streaming video), and large information databases, there has been an increase in the need not only for high-bandwidth I/O processing, but also for networked storage systems. Commonly elements within I/O systems include host bus adapters (HBAs) and redundant arrays of independent disks (RAID) controllers, both of which are commonly used with conventional bus protocols, such as peripheral component interface (PCI) or system packet interface level 4 (SPI-4) protocol.

FIG. 1 illustrates a conventional input/output (I/O) system 100 that includes a shared bus I/O controller 105. Shared bus I/O controller 105 further includes a PCI bridge 110 with an integrated exclusive OR (XOR) 112, a microprocessor 114, a memory 116, a first dual-port host bus adapter (HBA) 118 having a Port A and a Port B, a second dual-port HBA 120 likewise having a Port A and a Port B, and a dynamic random access memory (DRAM) 122. Furthermore, shared bus I/O controller 105 utilizes a pair of PCI-X buses. (The PCI-X specification is representative of a PCI bus with increased bandwidth capability, as is well known.) More specifically, PCI bridge 110 is electrically connected to Port A and Port B of dual-port HBA 118 via a PCI-X bus 124 and electrically connected to Port A and Port B of dual-port HBA 120 via a PCI-X bus 126, as shown in FIG. 1. Port A and Port B of dual-port HBA 118 and Port A and Port B of dual-port HBA 120 each have separate bi-directional paths connecting to PCI-X buses 124 and 126, respectively, also shown in FIG. 1. PCI-X buses 124 and 126 are shared buses, meaning both data and control information are handled via these buses.

Conventional I/O system 100 further includes a host 128, a host 130, a storage device 132, and a storage device 134; all external to shared bus I/O controller 105. In the example of FIG. 1, PCI-X bus 124 is dedicated to host port connections as illustrated by host 128 electrically connected to Port A of dual-port HBA 118 and host 130 electrically connected to Port B of dual-port HBA 120. Hosts 128 and 130 are representative of standard host or server applications. By contrast, PCI-X bus 126 is dedicated to back-end storage connections as illustrated by storage device 132 electrically connected to Port A of dual-port HBA 120 and storage device 134 electrically connected to Port B of dual-port HBA 120. Storage devices 132 and 134 are representative of standard storage devices, such as disk drives or tape controllers. Hosts 128 and 130 and storage devices 132 and 134 are electrically connected to their respective ports via a bus with full duplex capability.

PCI bridge 110 is a standard bridge device that communicates between a computer's microprocessor (in this case, microprocessor 114) and one or more local PCI buses (in this case are PCI-X buses 124 and 126). PCI bridge 110 is hardware commonly known in the art that also allows control/data information to pass from PCI-X bus 124 to PCI-X bus 126 and vice versa. Microprocessor 114 is any standard microcontroller device. In this application, microprocessor 114 serves as a memory controller that maps system memory into a bus-addressable architecture, such as PCI or PCI-X addressing schemes. PCI-X buses 124 and 126 are the primary data bus between microprocessor 114 and the outside world via dual-port HBAs 118 and 120. Microprocessor 114 may be, for example, a Pentium processor or a Power PC processor. Memory 116 is representative of any standard RAM/ROM device serving as local memory associated with microprocessor 114, as is well known.

Integrated within PCI bridge 110 is XOR 112, which is representative of an XOR engine that is programmed by microprocessor 114. XOR 112 is dedicated hardware for performing a well-known RAID function. For example, in RAID-5 or RAID-6 architecture, XOR 112 must calculate parity. Furthermore, electrically connected to PCI bridge 110 is DRAM 122. DRAM 122 is representative of memory that is mapped into the PCI space, so that DRAM 122 appears to reside on PCI-X bus 124 or 126.

Dual-port HBAs 118 and 120 are conventional devices for providing an interface connection between a SCSI device (such as a hard drive) and a processor, as is well known. Dual-port HBAs 118 and 120 are, for example, dual-port 4 Gb HBAs, such as those manufactured by QLogic Corporation (Aliso Viejo, Calif.). Dual-port HBAs 118 and 120 connect, for example, 800 MB/s buses with full duplex capability from their respective PCI-X buses to their respective external devices. More specifically, Port A of dual-port HBA 118 has an 800 MB/s fully duplexed bus connecting to host 128, Port B of dual-port HBA 118 has an 800 MB/s fully duplexed bus connecting to host 130, Port A of dual-port HBA 120 has an 800 MB/s fully duplexed bus connecting to storage element 132, and Port B of dual-port HBA 120 has an 800 MB/s fully duplexed bus connecting to storage element 134. On the PCI-X bus side of Ports A and B, dual-port HBAs 118 and 120 provide, for example, up to 1 GB/s of burst bandwidth available for either read or write transfers. Typical sustained bandwidth is around 800 MB/s. Since the PCI-X bus is a bi-directional bus, the available sustained bandwidth must be shared between read and write data bursts.

The operation of conventional shared bus I/O controller 105 is well known. In general terms, shared bus I/O controller 105 utilizes PCI-X bus 124 for to host port connections and PCI-X bus 126 for back-end storage connections. Both data and control information are handled via PCI-X buses 124 and 126. Shared bus I/O controller 105 is limited to a peak burst data rate of 2 Gb/s and a sustained bandwidth of 1.6 Gb/s by the PCI-X specifications. Also, latency is incurred when the direction of the bus changes between read and write bursts, as well as arbitration between the multiple clients on the shared bus. For example, dual-port HBAs 118 and 120 alone require 1.6 Gb/s of PCI-X bandwidth. Furthermore, the presence of the control information on PCI-X buses 124 and 126 uses PCI-X bus bandwidth and increases latency. Latency is most common when shared bus I/O controller 105 sends data out to a peripheral device, such as hosts 128 and 130 and storage elements 132 and 134, and must wait for the peripheral device to send a specific signal or set of data back.

Even though shared bus I/O controller 105, having separate host port connections and back-end storage connections, has improved bandwidth as compared with an I/O controller having only one PCI-X bus to direct all traffic, the bandwidth of shared bus I/O controller 105 is still constrained. Since both data and control information consume bandwidth, the amount of peripheral device traffic that may be sustained is physically limited to the bandwidth of the pair of shared PCI-X buses. Furthermore, all transactions take place serially to multiple peripheral devices on the limited bandwidth PCI-X buses, which will increase system latency.

The elements of shared bus I/O controller 105 (i.e., PCI bridge 110, XOR 112, microprocessor 114, memory 116, dual-port HBA 118, dual-port HBA 120, DRAM 122, PCI-X bus 124, and PCI-X bus 126) are typically discrete components arranged upon a printed circuit board (PCB). As a result, a further limitation in overall performance of shared bus I/O controller 105 is due to the lack of electrical integration. Lack of electrical integration inherently limits signal speed and signal integrity because of the physical distance between components.

Another example of an I/O controller is disclosed in U.S. Pat. No. 6,230,219, entitled, "High Performance Multi-channel DMA controller for a PCI Host Bridge with a Built-in Cache." The '219 patent describes a host bridge having a dataflow controller. The host bridge contains a read command path, which has a mechanism for requesting and receiving data from an upstream device. The host bridge also contains a write command path that has means for receiving data from a downstream device and for transmitting received data to an upstream device. A target controller is used to receive the read and write commands from the downstream device and to steer the read command toward the read command path and the write command toward the write command path. A bus controller is also used to request control of an upstream bus before transmitting the request for data of the read command and transmitting the data of the write command.

Although the '219 patent describes a suitable I/O controller for performing write and read operations, the bandwidth of the bus is still shared between both command and data information. The fact that the bus is used for both commands and data, i.e., is a shared bus, adversely affects bandwidth on, for example, a PCI bus. The control information on the bus uses bandwidth that could otherwise be used for data. Hence, the control information has the propensity for causing a bottleneck for data flow. The shared bus also contributes to the problem of increasing latency, which is the amount of time that one part of a shared bus I/O controller spends waiting for requested data or acknowledge signals. Latency is most common when a shared bus I/O controller sends data to a peripheral device, such as a host or a storage device, and waits for the peripheral device to return specific data. Accordingly, a need exists for a way of overcoming the bandwidth limitations of I/O controllers having a shared bus architecture, thereby improving the overall performance.

It is therefore an object of the invention to provide an I/O controller architecture that meets the architectural requirement to stream on all I/O ports with maximum performance.

It is another object of this invention to provide an I/O controller architecture that handles the rate of existing I/O technology for connections to hosts and disks without being the bottleneck.

It is yet another object of this invention to provide hardware integration of an I/O controller to achieve maximum performance.

SUMMARY OF THE INVENTION

The present invention is directed to an I/O controller architecture capable of maximizing I/O operations (IOPS) on all I/O ports by functioning at the rate of I/O connections to hosts and storage elements without becoming a bottleneck. In one exemplary embodiment, the I/O controller architecture has separate command and data paths, thereby eliminating the bandwidth used by the commands and thus increasing bandwidth available to the data buses. Additionally, the I/O controller architecture may use multiple dedicated data paths, for example, dedicated distributed buses, and provides increased speed due to improved hardware integration. The I/O controller architecture may also employ distributed processing methods that decouple the external microprocessor from much of the decision-making, thereby providing improved operating efficiency and thus more useable bandwidth at any given clock frequency.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 2:
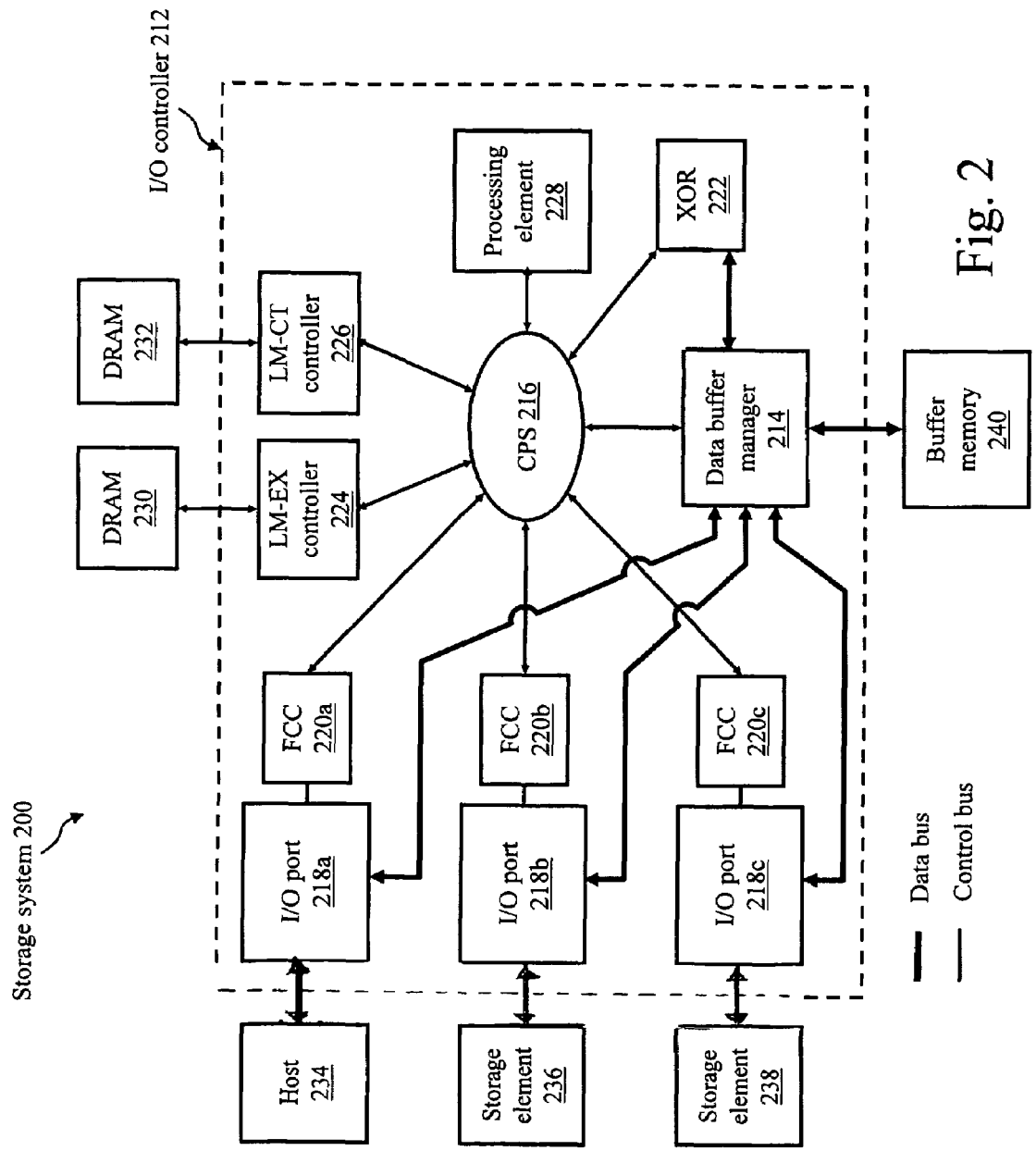
FIG. 2 illustrates a storage system that includes an I/O controller device that employs separate control and data paths in accordance with the present invention.

Now referring to the drawings, where like reference numeral designate like elements, there is shown in FIG. 2 a storage system 200 that includes an I/O controller 212 that further employs separate control and data buses in accordance with the present invention. I/O controller 212 further includes a data buffer manager 214; a crosspoint switch (CPS) 216; a plurality of I/O ports 218a, 218b, and 218c; a plurality of function control cores (FCCs) 220a, 220b, and 220c; a XOR 222; a list manager-exchange (LM-EX) controller 224; a list manager-cache table (LM-CT) controller 226; and a processing element 228.

Storage system 200 further includes a DRAM 230, a DRAM 232, a host 234, a storage element 236, a storage element 238, and a buffer memory 240. Although they are shown as external components, the present invention does not require them to be external and thus they may be integrated within I/O controller 212.

Data buffer manager 214 is the logic that facilitates the movement of data between all I/O ports 218a, 218b, and 218c and the buffer memory 240, which is the external buffer memory, cache, or system memory. Data buffer manager 214 is dedicated to data flow only and, thus, is the focal point for several dedicated data buses to each I/O port 218a, 218b, 218c. Each port of data buffer manager 214 is a full-duplex port. The traffic on these dedicated data buses includes only data.

Associated with the data buffer manager 214 is XOR 222, which is representative of an XOR function that is managed by processing element 228. Although shown as a separate unit in FIG. 2, the XOR 222 may alternatively be integrated within the data buffer manager 214. XOR 222 is dedicated hardware for performing a well-known XOR function. For example, in RAID-5 or RAID-6 architecture, XOR 222 must calculate parity. The amount of data transfer is significant in a RAID-5 or RAID-6 operation, and integrating XOR 222 into data buffer manager 214 enables parity generation to be performed in parallel with the other functions of data buffer manager 214. Data buffer manager 214 is designed not only to process the commands from all I/O ports 218 but also to expedite the parity data generated by integrated XOR 222. Because XOR 222 is managed by processing element 228, XOR 222 does not generate any external traffic and its data is directly coupled to data buffer manager 214, which supplies the read/write data buses necessary for generating parity.

Processing element 228 is a plurality of functional controllers that perform specific functions. These functions include: command decode, cache table look-up, parity generation, data rebuild from parity, disk mapping, and storage element command generation and distribution. Processing element 228 provides the control information to XOR 222 via CPS 216 in order to schedule parity operations.

CPS 216 is a well-known matrix switch or switching array in which physical buses exist to connect any I/O bus to any other I/O bus. CPS 216 is dedicated to control flow only and, thus, is the focal point for several dedicated control buses to data buffer manager 214, FCCs 220*a*, 220*b*, 220*c*, XOR 222, LM-EX controller 224, LM-CT controller 226, and processing element 228. Each port of CPS 216 is a full-duplex port. The traffic on these dedicated control buses includes only control information. CPS 216 is responsible for routing control packets generated by FCC 220*a*, FCC 220*b*, FCC 220*c*, or processing element 228 to LM-EX controller 224, LM-CT controller 226, XOR 222, or data buffer manager 214.

I/O ports 218*a*, 218*b*, 218*c* are ports for providing connection to external devices. For example, I/O port 218*a* has a read and write bus to external host 234, I/O port 218*b* has a read and write bus to external storage element 236, and I/O port 218*c* has a read and write bus to external storage element 238, as shown in FIG. 2. Since I/O ports 218*a*, 218*b*, 218*c* are full-duplex interfaces, all dedicated data buses within I/O controller 212 also have full duplex capability. Thus, not only can I/O port 218*a* send read data to host 234, for example, it can also receive write data from another host (not shown) and can simultaneously communicate with data buffer manager 214. Data buffer manager 214 also has full duplex capability and FIFOs on each data path connection to the I/O ports 218 and XOR 222. Thus, transaction processing within I/O controller 212 is concurrent for multiple host and storage element commands.

Each I/O port 218*a*, 218*b*, 218*c* is designed to have enough bandwidth to exceed its external port connection for IOPS. Each I/O port 218*a*, 218*b*, 218*c* extracts control information from the data bus connected to its respective external device and creates a data structure for control information. More specifically, each I/O port 218*a*, 218*b*, 218*c* has its own dedicated full-duplex data bus to data buffer manager 214 and its own dedicated full-duplex control bus to CPS 216 via its associated FCC 220*a*, 220*b*, 220*c*. The result is that data and control information within I/O controller 212 are separated into respective data and control buses, thus eliminating the conflict for bandwidth. As a result, I/O ports 218*a*, 218*b*, 218*c* are not sharing their traffic with any other peripheral devices, and data and control flows within I/O controller 212 are completely isolated from one another, providing greater per port bandwidth efficiency.

Figure 1:
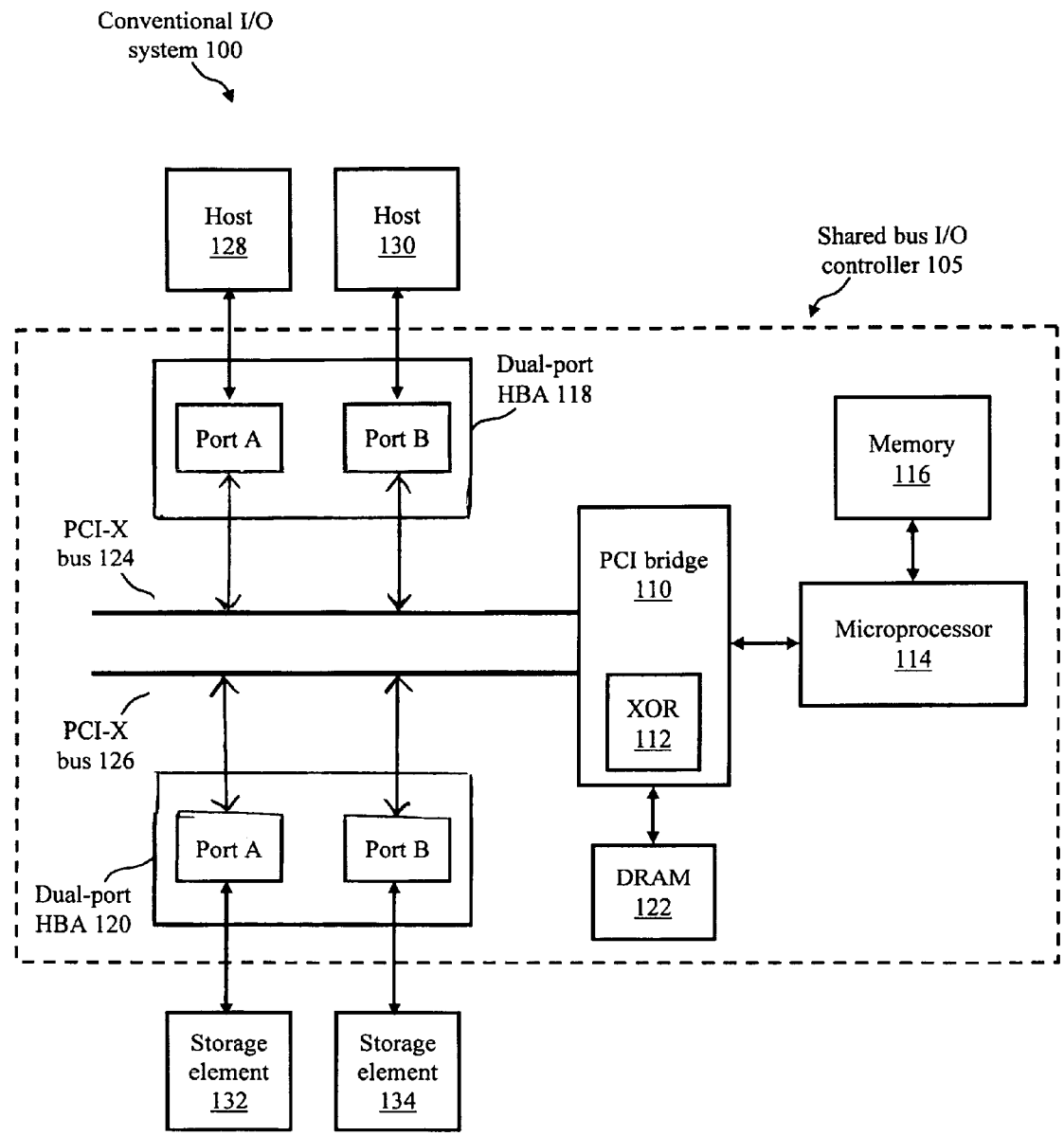
FIG. 1 illustrates a conventional I/O system that includes a shared bus I/O controller.

FCCs 220*a*, 220*b*, 220*c* are devices that interface between I/O port 218*a*, 218*b*, and 218*c*, respectively, and CPS 216 on the control buses. Each FCC 220*a*, 220*b*, 220*c* extracts the required control information from a received packet and sends the control information to CPS 216, which in turn routes the packet to processing element 228 with the assistance of LM-EX controller 224 and DRAM 230. A complete description of the interaction of FCCs 220, processing element 228, CPS 216, and list manager controllers (i.e., LM-EX controller 224 and LM-CT controller 226) may be found in U.S. patent application Ser. No. 10/429,048, entitled, "Scalable Transaction Processing Pipeline," which is hereby incorporated by reference. In summary, each FCC 220*a*, 220*b*, 220*c* and each list manager includes an outgoing FIFO (not shown) for sending packets and an incoming FIFO (not shown) for receiving packets. The outgoing FIFO is required to fill with a complete packet before sending another packet. Likewise, the incoming FIFO is required to fill with a complete packet before receiving another packet. When the list manager receives a request, it generates a pointer to the list entry specified in the packet of the corresponding list (or queue) in its corresponding DRAM. It then transfers the data in its FIFO to the corresponding DRAM and updates the head and tail pointers if necessary of the list that resides in DRAM. An asynchronous notification is then sent via control buses and CPS 216 to the receiving FCC 220 or processing element 228. The notified element may then request the control information pointed to by the head pointer for a given list from the list manager which is then returned via the control bus and CPS 216. In this manner, all control command information is passed between FCCs 220*a*, 220*b*, 220*c*, processing element 228, XOR 222, data buffer manager 214, and the list managers (i.e., LM-EX controller 224 and LM-CT controller 226). The flexibility of CPS 216 grants any FCC 220 access to any list manager within I/O controller 212 nearly simultaneously. The combination of an I/O port 218 with an FCC 220 is used to perform the function and has the intelligence of an HBA as described in FIG. 1; thus, I/O controller 212 has essentially the same capability as a controller which has three integrated HBA ports.

LM-EX controller 224 is the list manager associated with DRAM 230. LM-EX controller 224 performs operations using the lists stored in DRAM 230 when LM-EX controller 224 manages the exchange of control packets within I/O controller 212. LM-EX controller 224 contains head and tail pointers to all of the lists residing in DRAM 230. Likewise, LM-CT controller 226 is the list manager associated with DRAM 232. LM-CT controller 226 performs cache lookup table functions to identify requested data that may already be resident in buffer memory 240. Each list manager may process its respective data structure operations with its respectively coupled memories, simultaneously with respect to the other list managers, without causing memory bottlenecks. DRAM 230 and DRAM 232 are representative of any computer memory capable of reading and writing data.

Host 234 is representative of a standard host or server application. Storage elements 236 and 238 are representative of standard storage devices, such as disk drives or tape controllers.

Buffer memory 240 is representative of cache or system memory for cached reads and writes, redundancy operations, and rebuilding failed drives. Buffer memory 240 performs reads and writes to storage elements 236 and 238 or host 234 in order to provide data for cache misses, to provide data to XOR 222 for parity generation, or to provide parity information to XOR 222 in order to regenerate data.

The operation of an integrated I/O controller is fully disclosed in U.S. patent application Ser. No. 10/912,157, which is hereby incorporated by reference. For clarity, an example operation of I/O controller 212 is illustrated in FIG. 3.

Figure 3:
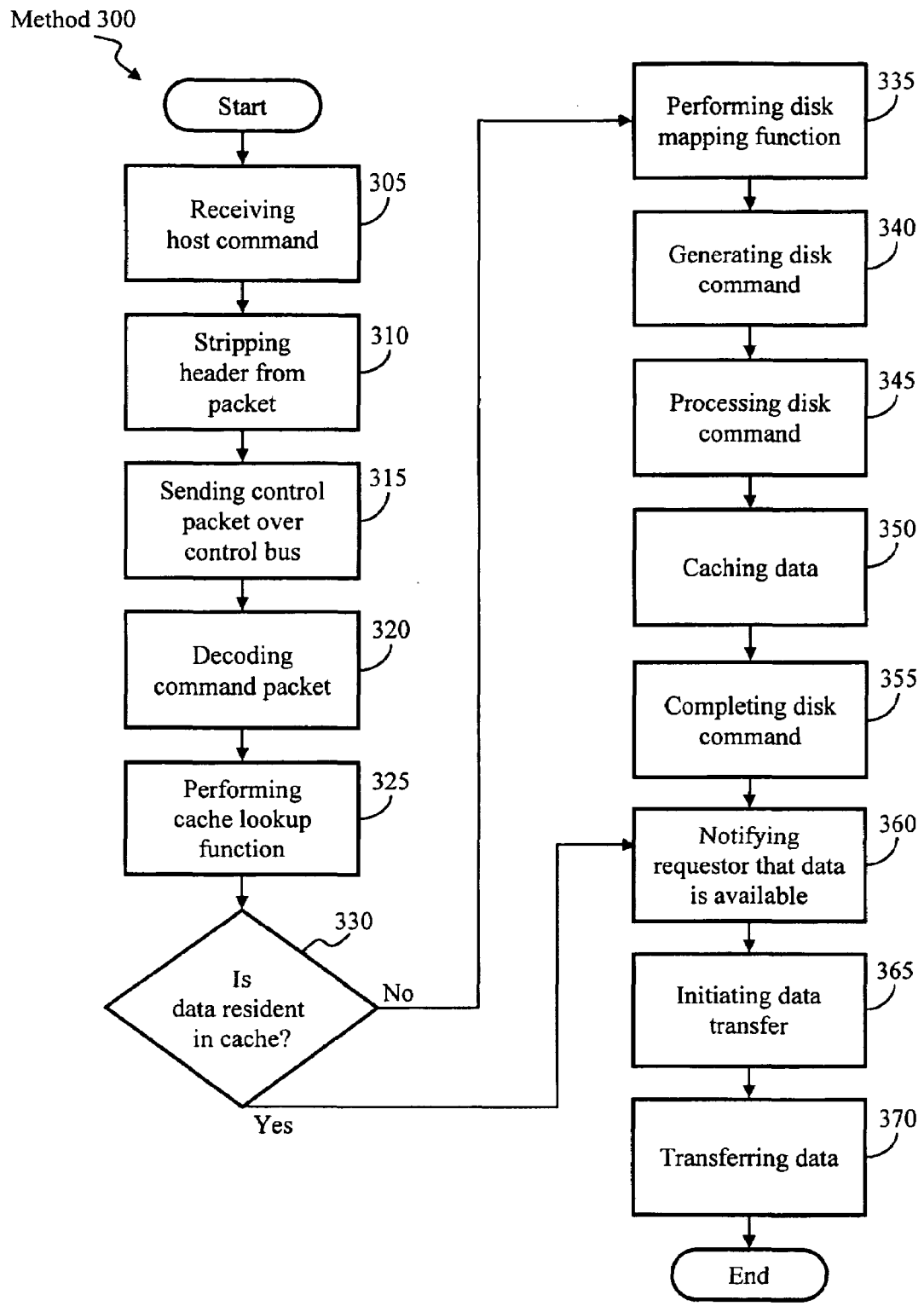
FIG. 3 is a flow diagram of an exemplary read command processing method in accordance with the present invention.

FIG. 3 is a flow diagram illustrating an examplary method 300 of a single-sector host read operation for host 234 via I/O port 218*a* of storage system 200 that further uses distributed control and data buses. Any type of command may be processed using storage system 200; however, for the purposes of simplification, only one type of command (a read command) is illustrated.

Step 305: Receiving Host Command

In this step, a host read command (e.g., a fibre channel command frame) enters I/O controller 212 via I/O port 218a, which is a host port in this example. Method 300 proceeds to step 310.

Step 310: Stripping Header from Packet

In this step, I/O port 218a, in combination with FCC 220a, strips the header information from the packet and extracts the payload, in this case a SCSI Command Descriptor Block (CDB). Method 300 proceeds to step 315.

Step 315: Sending Control Packet Over Control Bus

In this step, FCC 220a sends the packet to processing element 228 via CPS 216 using a control bus. Method 300 proceeds to step 320.

Step 320: Decoding Command Packet

In this step, processing element 228 performs a command decode function to determine that the command is a read request. Method 300 proceeds to step 325.

Step 325: Performing Cache Lookup Function

In this step, processing element 228 performs a cache look-up function using LM-CT controller 226 and DRAM 232. Method 300 proceeds to step 330.

Step 330: Is Data Resident in cache?

In this decision step, processing element 228 determines whether the data is resident in buffer memory 240. If yes, method 300 proceeds to step 360; if no, method 300 proceeds to step 335.

Step 335: Performing Disk Mapping Function

In this step, processing element 228 performs a disk mapping function to convert the logical block address (LBA) contained in the control information to a physical storage device. Method 300 proceeds to step 340.

Step 340: Generating Disk Command

In this step, processing element 228 generates a SCSI disk command in the form of a data structure for the corresponding storage device that contains the data requested, for this example, storage element 238. The mapped SCSI command data structure is routed through CPS 216 using a control bus to I/O port 218c. The routing process also includes steps performed by LM-EX controller 224, DRAM 230, and FCC 220c, as described in the '195 application. Method 300 proceeds to step 345.

Step 345: Processing Disk Command

In this step, I/O port 218c processes the mapped SCSI command and extracts the requested data from storage element 238. I/O controller 212 waits for storage element 238 to complete the transaction. Data is returned on I/O port 218c from storage element 238, and I/O port 218c directly transfers the data over the data bus to data buffer manager 214. Method 300 proceeds to step 350.

Step 350: Caching Data

In this step, data buffer manager 214 writes data received on the incoming data bus to the specified memory location in buffer memory 240 until the transfer is complete. The read data is now resident in buffer memory 240 (i.e., cache). Method 300 proceeds to step 355.

Step 355: Completing Disk Command

In this step, once the sector is transferred into buffer memory 240, FCC 220c indicates to processing element 228 that the mapped SCSI command is complete. FCC 220c notifies processing element 228 with the assistance of CPS 216, LM-EX controller 224, DRAM 230, and the control buses. Method 300 proceeds to step 360.

Step 360: Notifying Requestor that Data is Available

In this step, processing element 228 notifies FCC 220a that the requested data is available for transfer via CPS 216, LM-EX controller 224, DRAM 230, and the control buses. Method 300 proceeds to step 365.

Step 365: Initiating Data Transfer

In this step, FCC 220a initiates the data transfer between data buffer manager 214 and I/O port 218a directly over CPS 216. Method 300 proceeds to step 370.

Step 370: Transferring Data

In this step, data buffer manager 214 fetches the data from buffer memory 240 and pushes the data onto the dedicated data bus for I/O port 218a. Once the data arrives at I/O port 218a, it is pushed out as multiple fibre channel frames to host 234. When the last frame is transferred, method 300 ends.

In summary, due to the multiple dedicated data and control buses within I/O controller 212 of storage system 200, there is expanded capacity for sending control and data information to their respective destinations. More specifically, data buffer manager 214 manages the dedicated data buses and CPS 216 manages the control buses, both operating independently and concurrently. FCCs 220 extract control information from packets arriving on I/O ports 218 and create separate data structures for the control information. The result is the decoupling of data and control information and further routing each on separate buses, thereby eliminating the bus bandwidth limitations that are characteristic of conventional systems.

The split of control and data information within I/O controller 212 of storage system 200, and the application of dedicated buses for each I/O port 218 provides a unique architecture for concurrent data flow. This is largely a benefit of the level of hardware integration within I/O controller 212. Furthermore, processing element 228, LM-EX controller 224, LM-CT controller 226, and DRAMs 230 and 232 allow integrated I/O controller 212 to operate independently of a microprocessor or microcontroller, as referenced in FIG. 1. Thus, microprocessor bandwidth increases for processor-specific tasks, which improves overall system latency.

Consequently, I/O controller 212 of storage system 200 provides the benefit of extracting the command packet information from the data information, thereby increasing bandwidth availability for the data bus. It also provides a benefit by decreasing latency for the control operations because control hardware is no longer gated by bus availability as in conventional shared bus architectures.

Although the invention has been described in detail in connection with an exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. For example, although the invention has been described as including two list manager controllers (i.e., LM-EX controller 224 and LM-CT controller 226) respectively associated with two DRAM elements 230, 232, the invention may also be practiced with a single list manager controller (incorporating the functionality of controllers 224 and 226) associated with a single DRAM element. Accordingly, the invention is not limited by the foregoing description or drawings, but is only limited by the scope of the appended claims.

What is claimed as new and desired to be protected by Letters Patent of the United States is:

1. An I/O controller, comprising:
   a plurality of I/O ports for coupling to external devices and transceiving data and control information between said I/O controller and external devices;
   a plurality of function control cores, each respectively associated with and coupled to one of said plurality of I/O ports, each function control core transceiving the control information received at a respective one of said I/O ports and said I/O controller;
a data buffer manager for transceiving the data among said I/O ports and a buffer memory;
a plurality of dedicated data buses, each one of said dedicated data buses communicating only the data between one of said I/O ports or said buffer memory and said data buffer manager;
a control processor, for processing the control information; and
a control bus, for communicating only the control information among said plurality of function control cores and said control processor.

2. An I/O controller, comprising:
a plurality of I/O ports for coupling to external devices and transceiving data and control information between said I/O controller and external devices;
a plurality of function control cores, each respectively associated with and coupled to one of said plurality of I/O ports, each function control core transceiving the control information received at a respective one of said I/O ports and said I/O controller;
a data buffer manager for transceiving the data among said I/O ports and a buffer memory;
a data bus for communicating only the data, coupled to said plurality of I/O ports and said data buffer manager;
a control processor, for processing the control information;
a plurality of dedicated control busses; and
a switch;
wherein each on of said dedicated control buses communicates only the control information between one of said function control cores or said control processor and said switch, and said switch routes the control information between different ones of said dedicated control buses.

3. The I/O controller of claim 2, wherein said switch is a cross point switch.

4. The I/O controller of claim 2, wherein said control processor comprises:
a plurality of special function processors, each coupled via a respective one of said dedicated control buses to said switch; and
a processing element, coupled to said switch via a respective one of said dedicated control buses.

5. The I/O controller of claim 4, wherein said plurality of special function processors include a processor for calculating an exclusive OR operation.

6. The I/O controller of claim 4, wherein said plurality of special function processors include a processor for mapping between host addresses and disk addresses within a disk array.

7. The I/O controller of claim 4, wherein said plurality of special function processors include a processor for operating a cache memory.

* * * * *